Jan. 24, 1928.

A. STEINLE 1,657,326

MEASURING APPARATUS

Filed March 23, 1923

Inventor:

Adolf Steinle

Patented Jan. 24, 1928.

1,657,326

UNITED STATES PATENT OFFICE.

ADOLF STEINLE, OF JENA, GERMANY, ASSIGNOR TO FIRM OF CARL ZEISS, OF JENA, GERMANY.

MEASURING APPARATUS.

Application filed March 23, 1923, Serial No. 627,215, and in Germany March 29, 1922.

The present invention relates to apparatus for measuring inside diameters, viz such apparatus having one or several fixed caliper bodies and one movable caliper body, being under spring pressure, the motion of which body is transmitted on an increased scale to a rotatable index. In these apparatus the contact surfaces of the caliper bodies, which during the measurement are brought in contact with the inner surface to be examined, are mostly formed as spherical surfaces of comparatively small radius or the caliper bodies have at their outer ends more or less round points. Hence with the measurement there only takes place a point contact between the boundary surfaces of the caliper bodies and the inner surface to be measured, so that the result of measurement is affected by the ever existing irregularities of the surface, generally due to working the latter, and does not correspond to the mean value desirable for practical purposes. According to the present invention this drawback is avoided by disposing and constructing the caliper bodies in such a way that the contact surfaces of all caliper bodies are sections to one and the same sphere on the movable caliper body assuming its innermost position.

Figure 1:
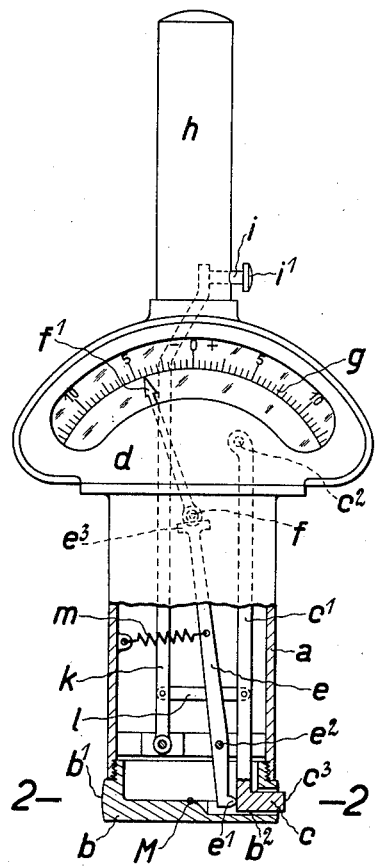
Figure 2:
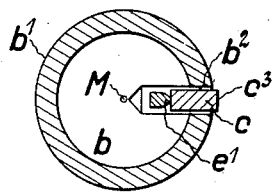
Figure 3:
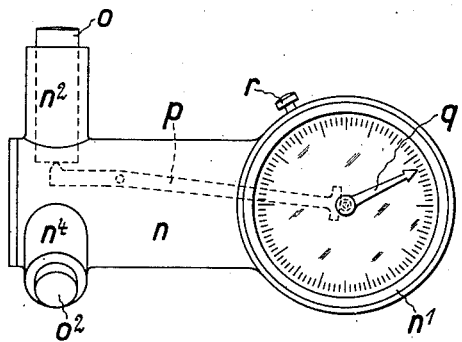

In the annexed drawing Fig. 1 shows partly in section a front view of a measuring apparatus for smaller diameters, Fig. 2 is a cross section on the line 2—2 of Fig. 1. Fig. 3 shows in a side elevation an apparatus suited for larger diameters, Fig. 4 is a front elevation of the same.

In the first example (see Figs. 1 and 2) a tube $a$ is closed at its bottom by a cap $b$ screwed in, the margin of which, $b^1$, is delimited by a spherical surface with the centre M. This spherical margin $b^1$ forms the fixed caliper body of the apparatus which thus approximately extends over the whole periphery. The cap $b$ has a bore $b^2$, directed to the centre M and at the same time perpendicularly to the axis of the tube $a$, within which bore there is a movable, round caliper body $c$. The latter forms one piece with a lever $c^1$, whose journal $c^2$ is disposed within a pointer casing $d$ fitted on the top of the tube $a$. The position of the journal $c^2$ is so chosen that the movable caliper body $c$ is guided with sufficient accuracy in the radial direction to the centre M. The outer boundary surface $c^3$ of the caliper body $c$ is a spherical surface of the same radius as that of the spherical surface $b^1$, and the centre of the spherical surface $c^3$ coincides, on the caliper body being entirely pressed inwardly, with the centre M of the spherical surface $b^1$. On the back of the caliper body $c$ rests by means of a nose $e^1$ the one arm of a two-armed lever $e$ which can be rotated about a fixed pivot $e^2$ and which is connected to a toothed wheel-segment $e^3$ at the end of the other arm. The motion of the toothed wheel-segment $e^3$ is transmitted by means of a driving wheel $f$ to an index $f^1$ moving over a scale $g$ disposed inside the casing $d$. On the top of the latter there is fixed a handle $h$, serving for the convenient operation of the apparatus. Laterally of the handle $h$ is a pin $i$, having a button $i^1$ and acting inside the apparatus on a lever $k$, bent at its top. The lever $k$ is hingedly connected with the caliper lever $c^1$ by means of an intermediate member $l$, so that by a pressure upon the button $i^1$ the movable caliper body $c$ can be drawn into the tube or casing $a$. By means of a spring $m$, stretched between the lever $e$ and the fixed tube-wall $a$, the caliper-body $c$ is continuously pressed outwardly with approximately uniform force.

The apparatus is used after the manner of the well-known dial measuring apparatus by introducing the apparatus with the button $i^1$ pushed back into the bore to be measured and by then releasing the button $i^1$. By the action of the spring $m$ the caliper body $c$ is pressed outwardly relative to the fixed caliper body $b$ and thereby the index $f^1$ set to the respective value.

Figure 4:
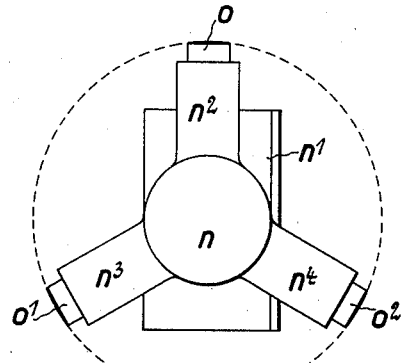

The second example shown in Figs. 3 and 4 substantially differs from the first by the feature that in the place of the spherical surface $b^1$ extending over the whole periphery only three segments of this surface are left. A short, cylindrical casing $n$, forming at the one end a dial casing $n^1$, is fitted at the other end with three radially disposed arms $n^2$, $n^3$ and $n^4$, two of which, viz. $n^3$ and $n^4$, carry a fixed caliper pin each, $o^1$ and $o^2$, respectively, whilst within the bored third arm $n^2$ there is supported a caliper pin $o$ displaceable in the longitudinal direction. The motion of the displaceable caliper pin $o$ is transmitted to a rotatable index $q$ by means of a lever $p$ in a similar manner as in the first example.

The outer boundary surfaces of the three caliper pins $o$, $o^1$ and $o^2$ are segments of spherical surfaces which, on the movable caliper pin $o$ having reached its terminal inner position, all belong to one and the same sphere. A button $r$ movable laterally of the dial casing $n^1$ again serves for pushing back the caliper pin $o$ before the introduction of the apparatus into a bore to be measured. The operation of the apparatus is the same as in the first example.

I claim:

1. In an inside measuring apparatus a casing, at least one contact member fixed on said casing, a contact member in said casing and movable relatively to the fixed contact member, a lever movably disposed in said casing and having one of its ends engaging said movable contact member, a spring engaging the other end of said lever for separating said contact members, said casing being provided with a scale, a movable index coacting with this scale, said movable index being connected to said lever, the contact members, having spherical end surfaces of one and the same curvature and in one position of the movable contact member all said end surfaces coinciding with the surface of one and the same sphere.

2. In an inside measuring apparatus a casing, one contact member fixed on said casing and having a spherical surface forming a segment of a zone which extends at least over one half of the periphery, a contact member in said casing and movable relatively to the fixed contact member, a lever movably disposed in said casing and having one of its ends engaging said movable contact member, a spring engaging the other end of said lever for separating said contact members, said casing being provided with a scale, a movable index coacting with this scale, said movable index being connected to said lever, the said movable contact member having a spherical end surface of the same curvature as the fixed contact member and in one position of the movable contact member the surfaces of both the said members coinciding with the surface of one and the same sphere.

ADOLF STEINLE.